UNITED STATES PATENT OFFICE.

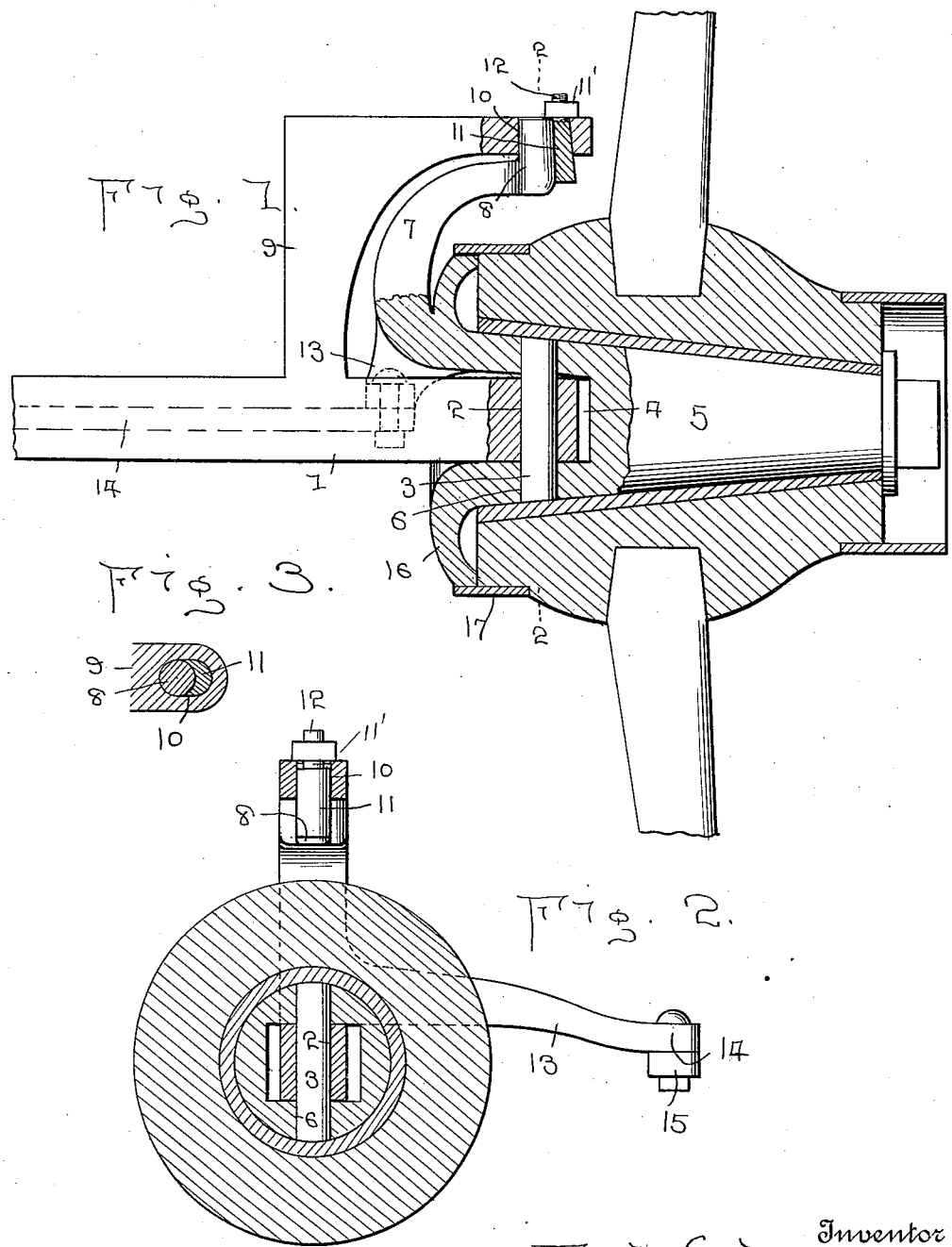

FRIEDRICH WILHELM BRANDT, OF WEIMAR, TEXAS.

VEHICLE GUIDING MECHANISM.

1,087,636.   Specification of Letters Patent.   Patented Feb. 17, 1914.

Application filed August 29, 1912. Serial No. 717,764.

*To all whom it may concern:*

Be it known that I, FRIEDRICH W. BRANDT, a citizen of the United States, residing at Weimar, in the county of Colorado and State of Texas, have invented certain new and useful Improvements in Vehicle Guiding Mechanism; and I do hereby declare the following to be a full, clear, and exact description of the invention, such as will enable others skilled in the art to which it appertains to make and use the same.

This invention relates to axles for vehicles, and more particularly to steering axles.

The object of the invention is to provide an improved and simplified construction by which the axles and wheel spindles of vehicles may be pivotally connected, and quickly and easily assembled and separated.

With this object in view, the invention consists in the improved construction, arrangement and combination of the parts of a device of the character specified, which will be hereinafter fully described, and afterward specifically claimed.

In the accompanying drawings, Figure 1 is a vertical fragmental sectional view through a wheel hub, a wheel spindle and an axle, connected in operative position. Fig. 2 is a vertical sectional view, on the plane indicated by the broken line 2—2 of Fig. 1, and, Fig. 3 is a horizontal sectional view through the upper pivot and the key-wedge.

Like reference characters mark the same parts wherever they occur in a plurality of the figures of the drawings.

Referring to these drawings, the axle 1 is provided at 2 with a bore for the reception of a vertical pivot pin 3, the end of the axle extending into a recess 4, in the inner end of a wheel spindle 5, said spindle being also provided with bores 6 through the upper and lower walls of the recess 4 which register with the bore 2 and communicate with the recess 4, the pivot pin 3 extending through the bores 2 and 6 to pivotally connect the wheel spindle and axle.

The wheel spindle is provided with a curved upwardly and outwardly extending arm 7 which is formed with a pivot 8 in vertical alinement with the bores 2 and 6 and pivot 3. The axle has a curved upwardly and outwardly extending arm 9 which is provided at 10 with a bore for receiving the pivot 8, so that the pivots 3 and 8 are in vertical alinement. The bore 10 is elliptic in cross section to accommodate a key 11, which is tapered or wedge shaped, being crescent shaped in cross section, formed with a screw threaded stem 12, and having a nut 11' fitted thereon. It is impossible for the wedge 11 to turn within the aperture 10, and so the nut 11' may be readily adjusted to tighten or loosen the wedge in the bore 10, and a snug pivotal connection may be maintained without danger of the nut 12 working loose.

The wheel spindle is provided with a steering arm 13 which extends approximately horizontally from the base of the arm 7, and pivotally connects at 14 with a steering link 15 which may be connected with any proper steering means (not shown). The arms 7 and 13 are preferably formed integrally with the wheel spindle.

While I have shown the arm 9 formed integrally with the axle 1, it is obvious that the arm and axle could be formed separately and secured together by any suitable means, if desired. The vertical distance through the recess 4 is greater than that of the axle 1, so that the end of the axle may be inserted in the recess 4 after the pivot 8 has been inserted in the bore 10. The horizontal width of the recess 4 is greater than that of the axle 1, so that the wheel spindle and axle may have relative horizontal movement around the pivot 3.

The inner end of the wheel spindle is flared outwardly in the shape of a bell as at 16, the rim of the bell-shaped portion extending within the binding ring 17 and contacting with the inner end of the hub, thus forming an overhung flange which shields the bell-shaped portion, and forms a closed annular channel to keep sand and grit from entering the hub and cutting out the skein and box.

In operation, by moving the link 14 toward the right, the arm 13 will be moved to the right thereby, so that the front part of the wheel would move likewise, and thereby cause the vehicle to be guided to the right; while, an opposite movement of the link 14 will obviously cause the vehicle to be guided to the left.

I do not limit my invention to the exact details of construction, combination and arrangement of parts as described and illustrated herewith, but my invention may only be limited by a reasonable interpretation of the claim.

What I claim as new is:—

A wheel spindle having a longitudinal socket in its inner end, angular in cross section and provided with vertical bores in its top and bottom walls, the inner ends of the spindle, forming the walls of the socket, being flared outwardly and curved back, the upper portion of said outwardly flared walls being formed into an upwardly and outwardly turned arm terminating in a vertical journal in alinement with the bores, in combination with an axle having its end of less cross-sectional size than the recess in the spindle and seated in said recess, said axle having a bore in vertical alinement with those in the spindle and with the journal on the curved arm, and an arm on the axle extending vertically, and thence horizontally in parallelism with the axle, said arm having a bore in alinement with those of the spindle and axle and adapted to receive the journal of the curved arm.

In testimony whereof I have signed my name to this specification in the presence of two subscribing witnesses.

FRIEDRICH WILHELM BRANDT.

Witnesses:
JOHN BARTA, Jr.,
EMIL BARTA.

Copies of this patent may be obtained for five cents each, by addressing the "Commissioner of Patents, Washington, D. C."